United States Patent
Kamiya et al.

(10) Patent No.: US 9,831,040 B2
(45) Date of Patent: Nov. 28, 2017

(54) ELECTRET SHEET AND PIEZOELECTRIC SENSOR

(71) Applicant: SEKISUI CHEMICAL CO., LTD., Osaka (JP)

(72) Inventors: Nobuto Kamiya, Osaka (JP); Bungo Hatta, Osaka (JP); Takazumi Okabayashi, Osaka (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 0 days.

(21) Appl. No.: 15/119,840

(22) PCT Filed: Mar. 10, 2015

(86) PCT No.: PCT/JP2015/057042
§ 371 (c)(1),
(2) Date: Aug. 18, 2016

(87) PCT Pub. No.: WO2015/137351
PCT Pub. Date: Sep. 17, 2015

(65) Prior Publication Data
US 2017/0062138 A1    Mar. 2, 2017

(30) Foreign Application Priority Data

Mar. 13, 2014 (JP) ................. 2014-050656

(51) Int. Cl.
*G01L 1/10* (2006.01)
*H01G 7/02* (2006.01)
(Continued)

(52) U.S. Cl.
CPC ............ *H01G 7/023* (2013.01); *C08J 9/0023* (2013.01); *C08J 9/0028* (2013.01); *G01L 1/16* (2013.01);
(Continued)

(58) Field of Classification Search
CPC ........ H01G 7/023; C08J 9/0023; C08J 9/0028; C08J 2201/026; C08J 2323/14;
(Continued)

(56) References Cited

U.S. PATENT DOCUMENTS 6,420,024 B1 *  7/2002  Perez ................. B01D 39/1623
                                                             428/359
2005/0048570 A1 *  3/2005  Weber ................. B01J 19/0046
                                                             506/6

(Continued)

FOREIGN PATENT DOCUMENTS

WO        2012/144411       10/2012

OTHER PUBLICATIONS

International Search Report dated May 26, 2015 in International (PCT) Application No. PCT/JP2015/057042.
(Continued)

*Primary Examiner* — Lisa Caputo
*Assistant Examiner* — Nigel Plumb
(74) *Attorney, Agent, or Firm* — Wenderoth, Lind & Ponack, L.L.P.

(57) ABSTRACT

The present invention provides an electret sheet which can maintain a high generated voltage even if a large amount of pressure has been applied. Disclosed is an electret sheet of the present invention including an electrically charged propylene-based resin foam sheet which contains a crosslinked propylene-based resin that includes a propylene-α-olefin random copolymer having a weight average molecular weight of 370,000 to 420,000 at a proportion of 60% by weight or more, and has a gel fraction of 30% to 50% by weight, and in which the average thickness is 90 to 150 μm, and the average number of foam cells in the thickness direction is 2 to 4 cells.

7 Claims, 1 Drawing Sheet

(51) Int. Cl.
*C08J 9/00* (2006.01)
*G01L 1/16* (2006.01)
(52) U.S. Cl.
CPC ...... *C08J 2201/026* (2013.01); *C08J 2323/14* (2013.01)
(58) Field of Classification Search
CPC ..... G01L 1/16; G01L 1/14; G01L 1/04; G01L 1/02; G01L 1/106; G01L 3/10; G01L 3/08; G01L 3/24; B60R 2021/01516; C08L 23/16; C08L 23/10; B31F 1/07; B32B 3/28
USPC ...... 73/862.625, 862.621, 862.325, 862.321, 73/862.587, 862.59, 862.381, 862; 525/194, 192, 191; 428/156, 98
See application file for complete search history.

(56) References Cited

U.S. PATENT DOCUMENTS

2014/0088214 A1* 3/2014 Okamoto ............. C08F 210/06
521/140
2014/0091249 A1* 4/2014 Uchida ................ H01L 41/193
252/62.9 R

OTHER PUBLICATIONS

Extended European Search Report issued Jul. 12, 2017 in European Application No. 15760815.9.

\* cited by examiner

ELECTRET SHEET AND PIEZOELECTRIC SENSOR

TECHNICAL FIELD

The present invention relates to an electret sheet and a piezoelectric sensor.

BACKGROUND ART

An electret is a material which has been imparted with an electrostatic charge internally by injecting an electric charge into an insulating polymer material. A piezoelectric sensor can be configured by laminating a signal electrode on a first surface of an electret sheet, and laminating a ground electrode on a second surface of the electret sheet.

PTL 1 discloses an electret sheet containing two kinds of polyolefins that are incompatible with each other, in which these two kinds of polyolefins form a phase-separated structure, and a polyolefin foam sheet formed as a result of the polyolefins being crosslinked by a polyfunctional monomer, is electrostatically charged by injection of a charge.

CITATION LIST

Patent Literature

[PTL 1] WO 2012/144411

SUMMARY OF INVENTION

Technical Problem

However, the electret sheet has a problem in that the voltage generated after a large amount of pressure has been applied is decreased. Therefore, a piezoelectric sensor which uses the electret sheet described above cannot be adequately used for applications where large amounts of pressure are applied.

The present invention provides an electret sheet which can maintain a high generated voltage even if a large amount of pressure has been applied (hereinafter, referred to as "pressure-resistant piezoelectricity"), and a piezoelectric sensor using this electret sheet.

Solution to Problem

An electret sheet of the present invention includes an electrically charged propylene-based resin foam sheet having an average thickness of 90 to 150 μm, a foaming ratio of 3.5 to 9 times, and a gel fraction of 30% to 50% by weight, in which the propylene-based resin foam sheet includes a resin composition containing a crosslinked body of a propylene-α-olefin random copolymer having a weight average molecular weight of 370,000 to 420,000 at a proportion of 60% by weight or more.

According to the electret sheet, the gel fraction of the propylene-based resin foam sheet is 35% to 50% by weight.

According to the electret sheet, the total content of fatty acids and fatty acid amides included in all of the crosslinked bodies of the propylene-α-olefin random copolymer in the resin composition is 50 ppm or less relative to the total weight of the crosslinked bodies of the propylene-α-olefin random copolymer.

According to the electret sheet, the crosslinked body of the propylene-α-olefin random copolymer is a crosslinked body formed using a polyfunctional acrylic monomer.

A piezoelectric sensor of the present invention includes the electret sheet; a signal electrode laminated on a first surface of the electret sheet; and a ground electrode laminated on the second surface of the electret sheet.

Advantageous Effects of Invention

The electret sheet of the present invention generates a high voltage even after a large amount of pressure has been applied, and thus exhibits excellent pressure-resistant piezoelectricity.

Furthermore, when the total content of fatty acids and fatty acid amides included in all of the crosslinked bodies of the propylene-α-olefin random copolymer in the resin composition is 50 ppm or less relative to the total weight of all of the crosslinked bodies of the propylene-α-olefin random copolymer in the resin composition, the electret sheet maintains superior piezoelectricity even after being left under high temperature condition.

DESCRIPTION OF EMBODIMENTS

The electret sheet and piezoelectric sensor of the invention will be explained in more detail. The electret sheet of the invention includes an electrically charged propylene-based resin foam sheet having an average thickness of 90 to 150 μm, a foaming ratio of 3.5 to 9 times, and a gel fraction of 35% to 50% by weight, and the propylene-based resin foam sheet contains a resin composition which includes 60% by weight or more of a crosslinked body of a propylene-α-olefin random copolymer having a weight average molecular weight of 370,000 to 420,000.

The propylene-based resin foam sheet contains a resin composition which includes a crosslinked body of a propylene-α-olefin random copolymer having a weight average molecular weight of 370,000 to 420,000. Regarding the propylene-α-olefin random copolymer, a propylene-ethylene random copolymer is preferred. The propylene-α-olefin random copolymer may be used singly or in combination of two or more kinds thereof. The resin composition that constitutes the propylene-based resin foam sheet may also include a crosslinked body of a propylene-α-olefin random copolymer having a weight average molecular weight of less than 370,000 or more than 420,000, as long as the resin composition includes a crosslinked body of a propylene-α-olefin random copolymer having a weight average molecular weight of 370,000 to 420,000 as an essential component.

Examples of the α-olefin that is copolymerized with propylene include ethylene, 1-butene, 1-pentene, 4-methyl-1-pentene, 1-hexene, 1-octene, 1-nonene, and 1-decene, and ethylene is preferred.

The content of the α-olefin unit in the propylene-α-olefin random copolymer is preferably 1% to 10% by weight, since the electret sheet has excellent pressure-resistant piezoelectricity.

In a graph for a propylene-α-olefin random copolymer in which the vertical axis represents the number of molecules and the horizontal axis represents the molecular weight, when there are plural peaks, it is implied that the propylene-α-olefin random copolymer includes plural kinds of propylene-α-olefin random copolymers. In such a case, the "weight average molecular weight of the propylene-α-olefin random copolymer" as used in the invention means the weight average molecular weight of the propylene-α-olefin random copolymers before propylene-α-olefin random copolymers are mixed.

The resin composition includes a crosslinked body of a propylene-α-olefin random copolymer having a weight average molecular weight of 370,000 to 420,000 as an essential component. This crosslinked body is a product obtained by crosslinking a propylene-α-olefin random copolymer having a weight average molecular weight of 370,000 to 420,000. When the weight average molecular weight of the propylene-α-olefin random copolymer before crosslinking is 370,000 to 420,000, an electret sheet having excellent pressure-resistant piezoelectricity is obtained.

The weight average molecular weight of the propylene-α-olefin random copolymer refers to the value measured using gel permeation chromatography (GPC). Specifically, the weight average molecular weight may be measured under the following conditions using GPC (trade name: "HLC-8121GPC/HT" manufactured by TOSHO Corp.). Measurement of the weight average molecular weight is performed three times, and the arithmetic mean value of the three sets of measurement results is designated as the weight average molecular weight of the propylene-α-olefin random copolymer.

Column: TSKgel GMHHR-H(20)HT×3 columns, TSK-guard column-HHR(30)HT×1 column

Mobile phase: o-DCB (o-dichlorobenzene) 1.0 mL/min

Resin sample concentration: about 0.1 weight/volume %

Detector: Bryce type refractometer

Reference substance: manufactured by Tosho Corp., polystyrene standards (weight average molecular weight: 500, 1010, 2630, 5970, 10200, 18100, 37900, 96400, 190000, 427000, 706000, 1090000, 2110000, 4480000, and 8420000)

Oven for measurement: 145° C.

Injection amount: 300 μL

In regard to the resin composition, the content of the crosslinked body of the propylene-α-olefin random copolymer having a weight average molecular weight of 370,000 to 420,000 is such that if the content is small, the pressure-resistant piezoelectricity of the electret sheet is decreased. Therefore, the content is 60% by weight or more, preferably 80% by weight or more, and more preferably 85% by weight or more.

The degree of crosslinking of the propylene-based resin foam sheet is expressed by the gel fraction. Since the pressure-resistant piezoelectricity of the electret sheet can be increased, the gel fraction of the propylene-based resin foam sheet is 30% to 50% by weight, and preferably 35% to 50% by weight.

The gel fraction of the propylene-based resin foam sheet refers to a value measured by the procedure described below. A sample of A (g) is collected from a propylene-based resin foam sheet. The sample is introduced into xylene at 140° C., and the sample is left to stand therein for 24 hours. Thereafter, an insoluble fraction is filtered through a 200-mesh wire gauze, the residue on the wire gauze is vacuum dried, and the weight B (g) of the dried residue is measured. Thus, the gel fraction is calculated by the following formula:

Gel fraction(wt %)=$(B/A)\times 100$

It is desirable that the propylene-α-olefin random copolymer is crosslinked by means of a general-purpose crosslinking agent. It is preferable that the propylene-α-olefin random copolymer is crosslinked by means of a polyfunctional acrylic monomer. That is, it is preferable that the propylene-α-olefin random copolymer is a crosslinked body formed by a polyfunctional acrylic monomer. On the occasion of crosslinking the propylene-α-olefin random copolymer, when a polyfunctional acrylic monomer is used, the gel fraction of the crosslinked body of the propylene-α-olefin random copolymer can be finely regulated, and an electret sheet having excellent pressure-resistant piezoelectricity can be obtained.

The crosslinking agent is not particularly limited; however, a polyfunctional monomer containing two or more functional groups selected from the group consisting of a vinyl group, an acryloyl group, a methacryloyl group, and an allyl group in the molecule is preferred, and a polyfunctional acrylic monomer containing two or more (meth)acryloyl groups is more preferred. Meanwhile, a (meth)acryloyl group means a methacryloyl group and/or an acryloyl group.

Specific examples of the polyfunctional monomer include a polyfunctional acrylic monomer, a polyfunctional vinylic monomer, and a polyfunctional allylic monomer. Examples of the polyfunctional acrylic monomer include trimethylolpropane tri(meth)acrylate, 1,6-hexanediol di(meth)acrylate, 1,9-nonanediol di(meth)acrylate, triethylene glycol di(meth)acrylate, tetraethylene glycol di(meth)acrylate, cyanoethyl (meth)acrylate, and bis(4-(meth)acryloxypolyethoxyphenyl)propane. Meanwhile, (meth)acrylate means methacrylate or acrylate. Examples of the polyfunctional vinylic monomer include divinylbenzene. Examples of the polyfunctional allylic monomer include trimellitic acid triallyl ester.

The content of the polyfunctional monomer component in all of the crosslinked bodies of the propylene-α-olefin random copolymer in the resin composition is preferably 0.5% to 10% by weight, and more preferably 1% to 9% by weight, since the charge retention property or flexibility of the propylene-based resin foam sheet is enhanced, and the pressure-resistant piezoelectricity of the electret sheet is further increased.

In regard to the propylene-α-olefin random copolymer, usually, fatty acids or fatty acid amides are attached to the surface of propylene-α-olefin random copolymer pellets, or fatty acids or fatty acid amides are incorporated in propylene-α-olefin random copolymer pellets, in order to reduce the friction between propylene-α-olefin random copolymer pellets inside an extruder at the time of extrusion molding.

In order to further enhance press-resistant piezoelectricity of the electret sheet, it is preferable to reduce the amount of fatty acids and fatty acid amides incorporated in the propylene-α-olefin random copolymer.

The total content of fatty acids and fatty acid amides included in all the crosslinked bodies of the propylene-α-olefin random copolymer included in the resin composition is preferably 50 ppm or less, more preferably 25 ppm or less, particularly preferably 10 ppm or less, and most preferably 1 ppm or less, relative to the total weight of all the crosslinked bodies of the propylene-α-olefin random copolymer included in the resin composition. When the total content of fatty acids and fatty acid amides is 50 ppm or less, the electret sheet has excellent pressure-resistant piezoelectricity, and also maintains excellent piezoelectricity even after being left under high temperature conditions.

Examples of the fatty acids include palmitic acid, stearic acid, erucic acid, lauric acid, oleic acid, myristic acid, and mylmitic acid. Fatty acid amides include saturated fatty acid amides and unsaturated fatty acid amides. Examples of the saturated fatty acid amides include palmitic acid amide, stearic acid amide, hydroxystearic acid amide, N-stearylerucic acid amide, N-stearylstearic acid amide, erucic acid amide, lauric acid amide, oleic acid amide, N-oleylpalmitic acid amide, N-oleylstearic acid amide, and methylenebisstearic acid amide. Examples of the unsaturated fatty acid amides include ethylenebisoleic acid amide.

Examples of the method of reducing the total content of fatty acids and fatty acid amides included in crosslinked bodies of the propylene-α-olefin random copolymer include: (1) a method of washing the propylene-α-olefin random copolymer with a solvent; and (2) a method of repeating the processes of melting and kneading the propylene-α-olefin random copolymer, leaching the fatty acids and fatty acid amides included inside the propylene-α-olefin random copolymer to the surface of the propylene-α-olefin random copolymer, and subsequently removing the fatty acids and fatty acid amides at the surface of the propylene-α-olefin random copolymer with a solvent several times. In the case of washing the propylene-α-olefin random copolymer with a solvent, the pressure at the time of washing is preferably $10^{-5}$ to $10^9$ Pa, and the temperature at the time of washing is preferably 5° C. to 200° C. The solvent is not particularly limited as long as the solvent can dissolve fatty acids and fatty acid amides, and examples thereof include alcohols such as methyl alcohol and ethyl alcohol; dichlorobenzene, benzene, toluene, xylene, organic acids, ketones, ethers, esters, chloroform, and tetrahydrofuran.

The total content of the fatty acids and fatty acid amides included in the crosslinked bodies of the propylene-α-olefin random copolymer is measured by the procedure described below. About 2 g of a sample obtained by immersing a crosslinked body of a propylene-α-olefin random copolymer in liquid nitrogen, cooling the crosslinked body, and then pulverizing the crosslinked body, is subjected to a cylindrical extraction filter made of glass. Subsequently, Soxhlet extraction is performed for 10 hours using chloroform, and thereby fatty acids and fatty acid amides included in the sample are extracted. Thus, a first extract is obtained. Furthermore, low molecular weight components included in the sample are re-precipitated using methanol and extracted with a membrane filter. Thus, a second extract is obtained. Chloroform and methanol are removed from the first extract and the second extract by distillation, and then the extract is dissolved in 3 mL of chloroform. Next, the total weight of the fatty acids and fatty acid amides is measured by a GC/MS analysis and a GC analysis. The GC/MS analysis is carried out, for example, under the following conditions.

GC/MS Analysis
Apparatus: GC/MS-QP5050A manufactured by Shimadzu Corp.
Column: Ultra ALLOY+-1 (MS/HT) 0.15 μm 0.25ϕ×15 m
Column temperature: 120° C. to 390° C., 12° C./min hold
Carrier: He 2.0 mL/min
Injection method: Split method
Injection amount: 1 μL
Ionization method: EI method
GC Analysis
Apparatus: Gas chromatography GC-2010 manufactured by Shimadzu Corp.
Column: Ultra ALLOY+-1 (S) 0.25 μm 0.25ϕ×15 m
Column temperature: 120° C. to 370° C., 10° C./min hold
Carrier: He 2.0 mL/min
Injection method: Split method
Detector: FID
Injection amount: 1 μL
Quantification method: Absolute calibration method (one-point method) (reference material: palmitic acid and stearic acid)

The average thickness of the propylene-based resin foam sheet is 90 to 150 μm, since the pressure-resistant piezoelectricity of the electret sheet is enhanced. Meanwhile, the average thickness of the propylene-based resin foam sheet is obtained by measuring the thicknesses at arbitrary five sites, and determining the arithmetic mean value of the thicknesses thus obtained.

The foaming ratio of the propylene-based resin foam sheet is 3.5 to 9 times, and preferably 4 to 8.5 times, since the pressure-resistant piezoelectricity of the electret sheet is enhanced. The foaming ratio of the propylene-based resin foam sheet refers to a value obtained by dividing the apparent volume ($cm^3$) of the propylene-based resin foam sheet by the weight (g) of the propylene-based resin foam sheet.

It is preferable that the propylene-based resin foam sheet is a compressed body obtained by compressing the foam sheet in the thickness direction, or a stretched body obtained by stretching the foam sheet in a direction along the sheet surface. In the compressed body or stretched body of the propylene-based resin foam sheet, the foam cell shape is a spindle shape having the plane direction of the foam sheet as the major axis. Foam cells having a spindle shape can easily deform in the thickness direction of the foam sheet. On the other hand, the propylene-based resin foam sheet contains a predetermined amount of a particular crosslinked body of a propylene-α-olefin random copolymer, and has a predetermined gel fraction. Therefore, the foam cell film has excellent elastic restoring force and excellent flexibility, and when a large amount of pressure is applied to the electret sheet, the foam cells flexibly deform, but complete breakage of the foam cells occurs to a reduced extent. Also, positive electric charges and negative electric charges existing in a polarized state in the foam film cancelling each other and disappearing can be substantially prevented. An electret sheet is such that even after a large amount of pressure has been applied, positive charges and negative charges exist satisfactorily in a polarized state, and thus an electret sheet maintains a high generated voltage and has excellent piezoelectricity.

The aspect ratio (major axis dimension of a foam cell/minor axis dimension of a foam cell) of the foam cells of the propylene-based resin foam sheet is preferably 1.5 to 500, and more preferably 2 to 200. When the aspect ratio (major axis dimension of a foam cell/minor axis dimension of a foam cell) of the foam cells of the propylene-based resin foam sheet is in the range described above, the foam cells flexibly deform without being completely destroyed under a large force applied to the electret sheet, and after the external force has been eliminated from the electret sheet, the foam cells can be elastically restored smoothly to the state before the pressure application. Therefore, an electret sheet generates a high voltage against a large amount of pressure. Furthermore, an electret sheet satisfactorily maintains a state in which positive charges and negative charges are polarized even after a large amount of pressure has been applied, and maintains excellent piezoelectricity.

Figure 1:
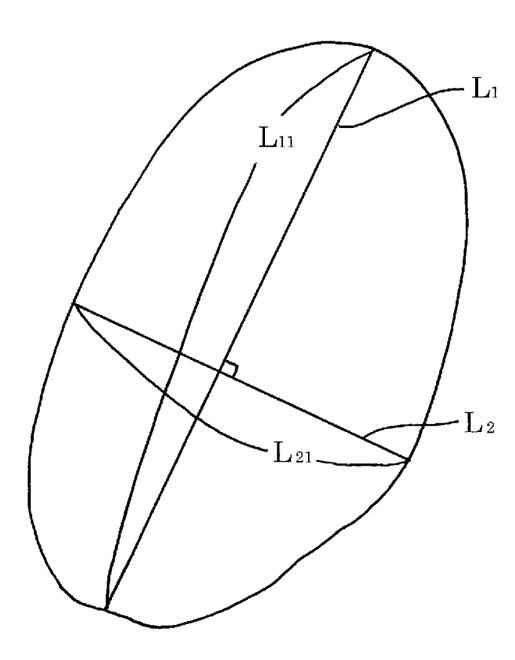
FIG. 1 is a schematic diagram showing the major axis dimension and the minor axis dimension of a foam cell of a propylene-based resin foam.

The major axis dimension and the minor axis dimension of a foam cell are measured by the procedure described below. A propylene-based resin foam sheet is cut across the entire length in the thickness direction. An image of a cut surface thus obtained is taken at a magnification ratio of 100 times using SEM. As illustrated in FIG. 1, for the foam cells shown in the cross-sectional photograph thus obtained, among the straight lines obtainable by connecting any two points on the foam cell wall forming a foam cell, the length $L_{11}$ of the longest straight line $L_1$ is designated as the major axis dimension. Among the straight lines that are obtainable by connecting any two points on the foam cell wall forming a foam cell, and perpendicularly intersect the straight line $L_1$, the length $L_{21}$ of the longest straight line $L_2$ is designated as the minor axis dimension. For each foam cell, the value obtained by dividing the major axis dimension $L_{11}$ by the minor axis dimension $L_{21}$ is designated as the aspect ratio of each foam cell. The arithmetic mean value of the aspect ratios of various foam cells is designated as the aspect ratio of the foam cells of the propylene-based resin foam sheet.

The resin composition that constitutes the propylene-based resin foam sheet may include additives such as an oxidation inhibitor, a metal harm inhibitor, an ultraviolet absorber, a pigment, and a dye, to the extent that the physical properties of the resin composition are not impaired.

Next, the method for producing an electret sheet is explained. First, a propylene-based resin foam sheet is produced. Regarding the method for producing a propylene-based resin foam sheet, for example, production methods described below may be used. For example, (1) a propylene-α-olefin random copolymer, a crosslinking agent, and a thermally decomposable foaming agent are supplied to an extruder and are melted and kneaded at a temperature lower than the decomposition temperature of the thermally decomposable foaming agent. A foamable resin sheet is extruded through a T-die provided on the extruder, and this foamable resin sheet is crosslinked by irradiating the foamable resin sheet with ionizing radiation. Next, the foamable resin sheet is foamed by heating the foamable resin sheet to a temperature higher than or equal to the decomposition temperature of the thermally decomposable foaming agent, and thus a propylene-based resin foam sheet is produced. (2) A propylene-α-olefin random copolymer, a crosslinking agent, and a thermally decomposable foaming agent are supplied to a Plastomill, and a foamable resin sheet is produced. The foamable resin sheet is crosslinked by irradiating the foamable resin sheet with ionizing radiation. Next, the foamable resin sheet is foamed by heating the foamable resin sheet to a temperature higher than or equal to the decomposition temperature of the thermally decomposable foaming agent, and thus a propylene-based resin foam sheet is produced.

Meanwhile, it is desirable that the thermally decomposable foaming agent generates gas as a result of decomposition, and examples thereof include azodicarbonamide, benzenesulfonyl hydrazide, dinitrosopentamethylenetetramine, toluenesulfonyl hydrazide, and 4,4-oxybis(benzenesulfonyl hydrazide).

The ionizing radiation is not particularly limited as long as it is capable of crosslinking the resin components included in the propylene-based resin foam sheet, and examples thereof include an electron beam, α-radiation, β-radiation, γ-radiation, and X-radiation, while an electron beam is preferred.

The intensity of the ionizing radiation irradiated to the foamable resin sheet is preferably 5 to 500 kGy, since the pressure-resistant piezoelectricity of the electret sheet can be enhanced.

The accelerating voltage at the time of irradiation of the foamable resin sheet with ionizing radiation is preferably 30 to 3000 kV, since the pressure-resistant piezoelectricity of the electret sheet can be enhanced.

The propylene-based resin foam sheet thus obtained is compressed in the thickness direction, or is stretched in the plane direction, if necessary.

Regarding the method for compressing the propylene-based resin foam sheet in the thickness direction, for example, a method of heating the propylene-based resin foam sheet into a softened state, and then compressing the propylene-based resin foam sheet in the thickness direction may be used.

The thickness ratio before and after compression of the propylene-based resin foam sheet (thickness after compression/thickness before compression) is preferably 1.5 to 30, and more preferably 2 to 20, since the foam cells of the propylene-based resin foam sheet can be made into a spindle shape having an appropriate aspect ratio, and the pressure-resistant piezoelectricity of the electret sheet can be enhanced.

Regarding the method for stretching the propylene-based resin foam sheet in the plane direction, for example, a method of heating the propylene-based resin foam sheet into a softened state, and then stretching the propylene-based resin foam sheet in the plane direction may be used.

The stretch ratio of the propylene-based resin foam sheet is preferably 1.5 to 30 times, more preferably 2 to 20 times, and particularly preferably 2 to 10 times, since the foam cells of the propylene-based resin foam sheet can be made into a spindle shape having an appropriate aspect ratio, and the pressure-resistant piezoelectricity of the electret sheet can be enhanced. Meanwhile, the stretch ratio of the propylene-based resin foam sheet refers to a value obtained by dividing the thickness of the foam sheet before stretching, by the thickness of the foam sheet after stretching.

An electret sheet can be produced by electrically charging the propylene-based resin foam sheet by injecting charges into the propylene-based resin foam sheet by a generally used procedure. The method for injecting charges into the propylene-based resin foam sheet is not particularly limited, and examples thereof include: (1) a method of interposing the propylene-based resin foam sheet between a pair of plate electrodes, electrically grounding one of the plate electrodes while connecting the other plate electrode to a high voltage direct current power supply, thereby applying a direct-current high voltage or a pulsatile high voltage to the propylene-based resin foam sheet, thus injecting electric charges to the resin foam sheet, and thereby electrically charging the propylene-based resin foam sheet; (2) a method of irradiating the propylene-based resin foam sheet with ionizing radiation such as an electron beam or X-radiation, or ultraviolet radiation, thereby ionizing air molecules in the vicinity of the propylene-based resin foam sheet, thus injecting electric charges to the propylene-based resin foam sheet, and thereby electrically charging the propylene-based resin foam sheet; and (3) a method of superimposing an electrically grounded plate electrode on one surface of the propylene-based resin foam sheet in a closely adhered state, installing a needle-like electrode or wire electrode electrically connected to a direct current high voltage power supply, on the other surface side of the propylene-based resin foam sheet while keeping a predetermined distance therebetween, generating corona discharge by electric field concentration onto the vicinity of the tip of the needle-like electrode or the surface of the wire electrode, ionizing air molecules, thereby causing the air ions thus generated by the polarity of the needle-like electrode or the wire electrode to repel, thus injecting electric charges to the propylene-based resin foam sheet, and electrically charging the propylene-based resin foam sheet. Among the methods described above, since electric charges can be easily injected into a synthetic resin sheet, the methods (2) and (3) are preferred, and the method (3) is more preferred.

In regard to the methods (1) and (3), if the absolute value of the voltage applied to the propylene-based resin foam sheet is too small, electric charges may not be injected sufficiently to the propylene-based resin foam sheet, and an electret sheet having high pressure-resistant piezoelectricity may not be obtained. If the absolute value of the voltage is too large, arc discharge occurs, and rather, electrical charges may not be injected sufficiently to the propylene-based resin foam sheet, and an electret sheet having high pressure-resistant piezoelectricity may not be obtained. Therefore, the absolute value of the voltage is preferably 3 to 100 kV, and more preferably 5 to 50 kV.

In regard to the method (2), if the absolute value of the accelerating voltage of the ionizing radiation irradiated to the propylene-based resin foam sheet is too small, the molecules in air may not be ionized sufficiently, electric charges may not be injected sufficiently to the propylene-based resin foam sheet, and an electret sheet having high pressure-resistant piezoelectricity may not be obtained. If the absolute value of the accelerating voltage is large, since the ionizing radiation permeates through air, the molecules in air may not be ionized. Thus, the absolute value of the accelerating voltage is preferably 5 to 15 kV.

Further, in regard to the electret sheet thus obtained, when an external force is applied to this electret sheet, the positive charges and negative charges that have been injected and stored in the synthetic resin sheet undergo relative displacement. Along with this relative displacement, satisfactory electric response occurs, and thus the electret sheet has excellent piezoelectricity.

Furthermore, in the electret sheet, the positive charges and the negative charges maintain a polarized state even after a large amount of pressure has been applied, and a high voltage can be generated by an external force. Thus, the electret sheet has excellent pressure-resistant piezoelectricity, and also maintains excellent pressure-resistant piezoelectricity even under high temperature conditions.

Piezoelectricity of an electret sheet is measured by the procedure described below. A flat square-shaped electret sheet which measures 10 cm on each side is prepared. Three sheets of a composite sheet formed by laminating and integrating aluminum foil having a thickness of 20 μm, onto one surface of a flat square-shaped polyethylene terephthalate sheet which measures 10 cm on each side and has a thickness of 100 are prepared. The composite sheets are referred to as first to third composite sheets.

The first composite sheet is laminated and integrated onto the first surface of the electret sheet using an acrylic adhesive. Meanwhile, the first composite sheet is laminated and integrated such that the aluminum foil of the first composite sheet is laid on the electret sheet side.

Next, an insulating sheet formed from a polyethylene terephthalate sheet having a thickness of 50 μm is laminated and integrated onto the first composite sheet that has been laminated and integrated with the electret sheet, using an acrylic adhesive.

Thereafter, the second composite sheet is laminated and integrated onto the insulating sheet using an acrylic adhesive. Meanwhile, the second composite sheet is laminated and integrated such that the aluminum foil of the second composite sheet is laid on the electret sheet side.

On the second surface of the electret sheet, the third composite sheet is laminated and integrated using an acrylic adhesive, and thereby a piezoelectric sensor is produced. Meanwhile, the third composite sheet is laminated and integrated such that the aluminum foil of the third composite sheet is laid on the electret sheet side.

In the above-described piezoelectric sensor, the aluminum foil of the first composite sheet serves as a signal electrode, the aluminum foil of the second composite sheet serves as a first ground electrode (shield electrode), and the aluminum foil of the third composite sheet serves as the second ground electrode.

Each of the second composite sheet and the third composite sheet has portions cut away such that notches thereof are superimposed in the thickness direction thereof and has notches formed thereon, and the second composite sheet and the third composite sheet are configured such that the first composite sheet is exposed to the outside through the notches of the second composite sheet. The thickness of the acrylic adhesive is 35 μm in all of the sheets. In the first composite sheet, portions are cut away, and notches are formed thereon.

Since the electret sheet of the piezoelectric sensor thus obtained contains unstable electric charges, the piezoelectric sensor is adjusted by maintaining the piezoelectric sensor at 80° C. for 24 hours.

A piercing terminal is driven into the signal electrode at the notches of the second composite sheet and the third composite sheet. A piercing terminal is driven into the first ground electrode and the second ground electrode at the notch of the first composite sheet, and the first ground electrode and the second ground electrode are electrically connected. The piercing terminal of the signal electrode and the piercing terminal of the first and second ground electrodes are respectively electrically connected to an oscilloscope through conductive wires. The first and second ground electrodes and the signal electrode are in an electrically insulated state. Regarding the oscilloscope, for example, an apparatus commercially available under the trade name "GDS-1062A" from GW Instek Co., Ltd. can be used.

A vibration exciter is fixed at the center of the surface of the piezoelectric sensor at a retention force of 25.5 kPa. The ambient temperature of the piezoelectric sensor is maintained at a desired measurement temperature, and then periodic vibration of 3.82 kPa at 30 Hz is applied to the piezoelectric sensor using the vibration exciter for 5 minutes. The voltage generated by this periodic vibration is measured by the oscilloscope, and the maximum generated voltage is usually designated as piezoelectricity. Meanwhile, regarding the vibration exciter, for example, a vibration exciter commercially available under the trade name "PM300" from Piezotest Pte., Ltd. can be used.

A separate piezoelectric sensor is prepared. The ambient temperature of the piezoelectric sensor is maintained at a desired measurement temperature, and then a pressure of 2 MPa is applied to the piezoelectric sensor in the thickness direction using a hydraulic press machine for 20 hours. After the pressure applied to the piezoelectric sensor is released, the maximum generated voltage of the piezoelectric sensor is measured by the same procedure as that normally used to measure piezoelectricity. The maximum generated voltage is designated as the pressure-resistant piezoelectricity. Meanwhile, regarding the hydraulic press machine, for example, a hydraulic press machine commercially available under the trade name "NSF-37" from Shinto Metal Industries Corp. can be used.

A piezoelectric sensor is configured by laminating a signal electrode on the first surface of the electret sheet, and laminating a ground electrode on the second surface of the electret sheet. It is configured such that the potential generated in the electret sheet can be measured through the signal electrode while the ground electrode is used as a reference electrode. In the piezoelectric sensor thus obtained, even after a large amount of pressure has been applied, positive electric charges and negative electric charges maintain a polarized state, and the piezoelectric sensor can generate a high voltage by an external force so that the piezoelectric sensor has excellent pressure-sensitive piezoelectricity. Meanwhile, the signal electrode and the ground electrode may be laminated directly on the first surface or the second surface of the electret sheet, or may be laminated through an adhesive. Regarding the adhesive, for example, an acrylic adhesive may be used.

Piezoelectric sensors can be used, for example, for the applications described below. Piezoelectric sensors can be installed under car seats, covers for car seats, seat belts of cars, lumbar pain preventive cushions, and mattresses used in beds and futons; on the surface or inside sleeping pads, on the surface or inside sleeping mats, on the surface or inside pillows, on the surface or inside garments, inside the pockets provided in garments, on the surface or inside shoe soles, scarves, wristbands, rings, adhesive plasters, wrist watches, spectacles, toilet seats, bath tubs, sofas, chairs, and floors; and in body weight scales, and can be used in order to obtain biological signals such as pulse, respiration, snoring, uttered voice, and body motion. Piezoelectric sensors are installed on the roads or floor surfaces, or on the walls or pillars connected to roads or floor surfaces, and can be used as sensors that detect the presence or absence of the passage of people, based on the vibration generated when people walk on the roads or floor surfaces.

Piezoelectric sensors can be installed under the feet of beds, and can be used as sensors that detect whether a person on a bed has left the bed, based on the vibration occurring when the person on the bed leaves the bed.

Piezoelectric sensors can be installed on the ground or installed near the surface of underground, and can be used as sensors that detect the presence or absence of the passage of cars or trains, based on the vibration generated when cars or trains run on the ground.

Furthermore, piezoelectric sensors can be installed below constructions or structures used as sensors that detect shaking or abnormality of the constructions or structures.

EXAMPLES

Hereinafter, Examples of the invention are described, but the invention is not intended to be limited to the following Examples.

Examples 1 to 42 and Comparative Examples 1 to 22

Propylene-ethylene random copolymers A to E as described below were prepared.

Propylene-ethylene random copolymer A (trade name "WINTEC WFX4T" manufactured by Japan Polypropylene Corp., content of ethylene units: 4% by weight, weight average molecular weight: 377000, total content of fatty acids and fatty acid amides: 730 ppm)

Propylene-ethylene random copolymer B (trade name "WINTEC WEG7T" manufactured by Japan Polypropylene Corp., content of ethylene units: 1% by weight, weight average molecular weight: 408000, total content of fatty acids and fatty acid amides: 540 ppm)

Propylene-ethylene random copolymer C (trade name "NOVATEC EG7FTB" manufactured by Japan Polypropylene Corp., content of ethylene units: 1% to 10% by weight, weight average molecular weight: 413000, total content of fatty acids and fatty acid amides: 30 ppm)

Propylene-ethylene random copolymer D (trade name "PRIME POLYPRO B221WA" manufactured by Prime Polymer Co., Ltd., content of ethylene units: 1% to 10% by weight, weight average molecular weight: 508000, total content of fatty acids and fatty acid amides: 780 ppm)

Propylene-ethylene random copolymer E (trade name "PRIME POLYPRO B241" manufactured by Prime Polymer Co., Ltd., weight average molecular weight: 527000, total content of fatty acids and fatty acid amides: 250 ppm)

200 mL of o-dichlorobenzene was heated to 130° C. Subsequently, the propylene-ethylene random copolymers A to E were respectively and separately supplied to o-dichlorobenzene, and o-dichlorobenzene was stirred for over 30 minutes at 130° C. Thereby, the propylene-ethylene random copolymers A to E were dissolved in o-dichlorobenzene, and the fatty acids and fatty acid amides contained in the propylene-ethylene random copolymers were eluted into o-dichlorobenzene. An o-dichlorobenzene solution of a propylene-ethylene random copolymer was added dropwise into 4.0 L of isopropanol at normal temperature using a dropping pipette, and thereby rapid cooling of the o-dichlorobenzene solution and precipitation of the propylene-ethylene random copolymer into isopropanol were carried out rapidly and simultaneously. The propylene-ethylene random copolymer was filtered and separated from isopropanol and then was dried, and thereby a propylene-ethylene random copolymer having a reduced content of fatty acids and fatty acid amides was obtained. The propylene-ethylene random copolymers A to E having reduced contents of fatty acids and fatty acid amides were respectively designated as propylene-ethylene random copolymers AW to EW, respectively.

Propylene-ethylene random copolymer AW (trade name "WINTEC WFX4T" manufactured by Japan Polypropylene Corp., content of ethylene units: 4% by weight, total content of fatty acids and fatty acid amides: less than 1 ppm)

Propylene-ethylene random copolymer BW (trade name "WINTEC WEG7T" manufactured by Japan Polypropylene Corp., content of ethylene units: 1% by weight, total content of fatty acids and fatty acid amides: less than 1 ppm)

Propylene-ethylene random copolymer CW (trade name "NOVATEC EG7FTB" manufactured by Japan Polypropylene Corp., content of ethylene units: 1% to 10% by weight, total content of fatty acids and fatty acid amides: less than 1 ppm)

Propylene-ethylene random copolymer DW (trade name "PRIME POLYPRO B221WA" manufactured by Prime Polymer Co., Ltd., content of ethylene units: 1% to 10% by weight, total content of fatty acids and fatty acid amides: less than 1 ppm)

Propylene-ethylene random copolymer EW (trade name "PRIME POLYPRO B241" manufactured by Prime Polymer Co., Ltd., total content of fatty acids and fatty acid amides: less than 1 ppm)

The propylene-ethylene random copolymers A to E and AW to EW, trimethylolpropane trimethacrylate, azodicarbonamide, methylbenzotriazole, and tetrakis[3-(3,5-di-tert-butyl-4-hydroxyphenyl)propionyloxymethyl]methane were supplied in the predetermined amounts indicated in Tables 1 to 9 to an extruder, and were melted and kneaded. The resultant was extruded into a sheet form through a T-die, and thus a foamable resin sheet having a thickness of 450 μm was produced. The foamable resin sheet was cut into a flat square shape which measured 30 cm on each side.

The foamable resin sheet thus obtained was irradiated on both surfaces with an electron beam under the conditions of an accelerating voltage of 300 kV at the intensities indicated in Tables 1 to 9, and thus the propylene-ethylene random copolymer of the foamable resin sheet was crosslinked.

The foamable resin sheet was foamed by heating the foamable resin sheet to 250° C., and thus a propylene-based resin foam sheet was obtained. The propylene-based resin foam sheet thus obtained was maintained in a soft state at 130° C., and the propylene-based resin foam sheet was uniaxially stretched at the stretch ratios indicated in Tables 1 to 9 at a stretching rate of 900 mm/min in the extrusion direction, using an automatic uniaxial stretching apparatus (trade name "IMC-18C6" manufactured by Imoto Machinery Co., Ltd.).

An electrically grounded plate electrode was superimposed on one surface of the propylene-based resin foam sheet in a closely adhered state, and a needle-like electrode electrically connected to a direct current high voltage power supply was provided on the other surface side of the propylene-based resin foam sheet, with a predetermined distance being kept therebetween. Corona discharge was generated by electric field concentration in the vicinity of the surface of the needle-like electrode under the conditions of a voltage of −10 kV, a discharge distance of 10 mm, and a duration of voltage application of 1 minute, and thus air molecules were ionized. Thereby, the air ions generated by the polarity of the needle-like electrode were caused to repel, and thus the propylene based resin foam sheet was electrically charged. Thereafter, the propylene-based resin foam sheet having electrical charges injected therein was maintained in a state of being wrapped with an earthed aluminum foil for 3 hours, and thus an electret sheet was obtained.

For the electret sheet thus obtained, the gel fraction, average thickness, foaming ratio, normal piezoelectricity at 35° C. and 80° C., and pressure-resistant piezoelectricity at 35° C. and 80° C. were measured by the procedures described above, and the results are presented in Tables 1 to 9. The electret sheet thus obtained was aged for one day at 80° C. The pressure-resistant piezoelectricity at 35° C. of the aged electret sheet was measured by the procedure described above. The results are presented in the column of "Pressure-resistant piezoelectricity after aging at 80° C." in Tables 1 to 9. Additionally, the "Total content of fatty acids and fatty acid derivatives (ppm)" in the tables means the "total content of fatty acids and fatty acid amides contained in all of the crosslinked bodies of propylene-ethylene random copolymers in the resin composition, with respect to the total weight of all of the crosslinked bodies of propylene-ethylene random copolymers in the resin composition". In the column of the "Total content of fatty acids and fatty acid derivatives (ppm)" in the tables, <1" means "less than 1 ppm".

TABLE 1

| | | | | colspan="9" Example |
|---|---|---|---|---|---|---|---|---|---|---|---|
| | | | | 1 | 2 | 3 | 4 | 5 | 6 | 7 | 8 | 9 |
| Composition (parts by weight) | Resin | Propylene-ethylene random copolymer | A | 100 | 100 | 100 | 0 | 0 | 0 | 0 | 0 | 0 |
| | | | B | 0 | 0 | 0 | 100 | 100 | 100 | 0 | 0 | 0 |
| | | | C | 0 | 0 | 0 | 0 | 0 | 0 | 100 | 100 | 100 |
| | Crosslinking agent | Trimethylolpropane trimethacrylate | | 3.6 | 3.6 | 3.6 | 3.6 | 3.6 | 3.6 | 3.6 | 3.6 | 3.6 |
| | Foaming agent | Azodicarbonamide | | 4.3 | 6.5 | 8.8 | 4.3 | 6.5 | 8.8 | 4.3 | 6.5 | 8.8 |
| | Metal harm inhibitor | Methylbenzotriazole | | 0.5 | 0.5 | 0.5 | 0.5 | 0.5 | 0.5 | 0.5 | 0.5 | 0.5 |
| | Oxidation inhibitor | Tetrakis[3-(3,5-di-tert-buthyl-4-hydroxyphenyl)propionyloxymethyl]methane | | 1 | 1 | 1 | 1 | 1 | 1 | 1 | 1 | 1 |
| Electron beam irradiation intensity (kGy) | | | | 25 | 25 | 25 | 25 | 25 | 25 | 25 | 25 | 25 |
| Stretch ratio (times) | | | | 4 | 4 | 4 | 4 | 4 | 4 | 4 | 4 | 4 |
| Evaluation | Total content of fatty acids and fatty acid derivatives(ppm) | | | 730 | 730 | 730 | 540 | 540 | 540 | 30 | 30 | 30 |
| | Average thickness of polypropylene-based resin foam sheet (μm) | | | 124 | 120 | 123 | 125 | 125 | 121 | 126 | 122 | 124 |
| | Foaming ratio (times) | | | 4.2 | 6.5 | 8.1 | 4.1 | 6.2 | 8.1 | 4.3 | 5.9 | 8 |
| | Gel fraction (wt %) | | | 35 | 35 | 35 | 36 | 36 | 36 | 36 | 36 | 36 |
| | Piezoelectricity (mV) | Normal piezoelectricity | 35° C. | 154 | 172 | 185 | 152 | 170 | 186 | 155 | 173 | 182 |
| | | Pressure-resistant piezoelectricity | | 146 | 165 | 181 | 147 | 163 | 179 | 150 | 165 | 174 |
| | | Normal piezoelectricity | 80° C. | 155 | 171 | 187 | 154 | 173 | 183 | 152 | 172 | 183 |
| | | Pressure-resistant piezoelectricity | | 122 | 126 | 127 | 119 | 124 | 125 | 122 | 122 | 128 |
| | | Pressure-resistant piezoelectricity after aging at 80° C. | 35° C. | 15 | 20 | 21 | 35 | 36 | 40 | 80 | 82 | 85 |

TABLE 2

| | | | | colspan="9" Example |
|---|---|---|---|---|---|---|---|---|---|---|---|
| | | | | 10 | 11 | 12 | 13 | 14 | 15 | 16 | 17 | 18 |
| Composition (parts by weight) | Resin | Propylene-ethylene random copolymer | AW | 100 | 100 | 100 | 0 | 0 | 0 | 0 | 0 | 0 |
| | | | BW | 0 | 0 | 0 | 100 | 100 | 100 | 0 | 0 | 0 |
| | | | CW | 0 | 0 | 0 | 0 | 0 | 0 | 100 | 100 | 100 |
| | Crosslinking agent | Trimethylolpropane trimethacrylate | | 3.6 | 3.6 | 3.6 | 3.6 | 3.6 | 3.6 | 3.6 | 3.6 | 3.6 |

TABLE 2-continued

| | | | | Example | | | | | | | | |
|---|---|---|---|---|---|---|---|---|---|---|---|---|
| | | | | 10 | 11 | 12 | 13 | 14 | 15 | 16 | 17 | 18 |
| | Foaming agent | Azodicarbonamide | | 6.5 | 6.5 | 6.5 | 6.5 | 6.5 | 6.5 | 6.5 | 6.5 | 6.5 |
| | Metal harm inhibitor | Methylbenzotriazole | | 0.5 | 0.5 | 0.5 | 0.5 | 0.5 | 0.5 | 0.5 | 0.5 | 0.5 |
| | Oxidation inhibitor | Tetrakis[3-(3,5-di-tert-buthyl-4-hydroxyphenyl)pro-pionyloxymethyl]methane | | 1 | 1 | 1 | 1 | 1 | 1 | 1 | 1 | 1 |
| Electron beam irradiation intensity (kGy) | | | | 30 | 35 | 40 | 30 | 35 | 40 | 30 | 35 | 40 |
| Stretch ratio (times) | | | | 4 | 4 | 4 | 4 | 4 | 4 | 4 | 4 | 4 |
| Evaluation | Total content of fatty acids and fatty acid derivatives (ppm) | | | <1 | <1 | <1 | <1 | <1 | <1 | <1 | <1 | <1 |
| | Average thickness of polypropylene-based resin foam sheet (μm) | | | 125 | 122 | 126 | 124 | 124 | 121 | 124 | 126 | 122 |
| | Foaming ratio (times) | | | 5.8 | 6.3 | 6.2 | 6 | 6 | 5.8 | 6.2 | 6.1 | 6.5 |
| | Gel fraction (wt %) | | | 38 | 44 | 48 | 40 | 45 | 49 | 39 | 45 | 48 |
| | Piezoelectricity (mV) | Normal piezoelectricity | 35° C. | 175 | 173 | 172 | 173 | 173 | 171 | 174 | 172 | 176 |
| | | Pressure-resistant piezoelectricity | | 171 | 165 | 166 | 170 | 164 | 165 | 163 | 161 | 166 |
| | | Normal piezoelectricity | 80° C. | 173 | 172 | 171 | 176 | 174 | 172 | 172 | 174 | 173 |
| | | Pressure-resistant piezoelectricity | | 165 | 157 | 155 | 161 | 157 | 151 | 155 | 152 | 154 |
| | | Pressure-resistant piezoelectricity after aging at 80° C. | 35° C. | 101 | 105 | 103 | 103 | 98 | 100 | 101 | 103 | 104 |

TABLE 3

| | | | | Example | | | | | | | | |
|---|---|---|---|---|---|---|---|---|---|---|---|---|
| | | | | 19 | 20 | 21 | 22 | 23 | 24 | 25 | 26 | 27 |
| Composition (parts by weight) | Resin | Propylene-ethylene random copolymer | AW | 100 | 100 | 100 | 0 | 0 | 0 | 0 | 0 | 0 |
| | | | BW | 0 | 0 | 0 | 100 | 100 | 100 | 0 | 0 | 0 |
| | | | CW | 0 | 0 | 0 | 0 | 0 | 0 | 100 | 100 | 100 |
| | Crosslinking agent | Trimethylolpropane trimethacrylate | | 3.6 | 3.6 | 3.6 | 3.6 | 3.6 | 3.6 | 3.6 | 3.6 | 3.6 |
| | Foaming agent | Azodicarbonamide | | 4.3 | 6.5 | 8.8 | 4.3 | 6.5 | 8.8 | 4.3 | 6.5 | 8.8 |
| | Metal harm inhibitor | Methylbenzotriazole | | 0.5 | 0.5 | 0.5 | 0.5 | 0.5 | 0.5 | 0.5 | 0.5 | 0.5 |
| | Oxidation inhibitor | Tetrakis[3-(3,5-di-tert-buthyl-4-hydroxyphenyl)pro-pionyloxymethyl]methane | | 1 | 1 | 1 | 1 | 1 | 1 | 1 | 1 | 1 |
| Electron beam irradiation intensity (kGy) | | | | 25 | 25 | 25 | 25 | 25 | 25 | 25 | 25 | 25 |
| Stretch ratio (times) | | | | 5 | 5 | 5 | 5 | 5 | 5 | 5 | 5 | 5 |
| Evaluation | Total content of fatty acids and fatty acid derivatives (ppm) | | | <1 | <1 | <1 | <1 | <1 | <1 | <1 | <1 | <1 |
| | Average thickness of polypropylene-based resin foam sheet (μm) | | | 96 | 97 | 93 | 98 | 95 | 94 | 97 | 94 | 95 |
| | Foaming ratio (times) | | | 4.1 | 6 | 8.2 | 4 | 6.3 | 7.8 | 4 | 6.1 | 8 |
| | Gel fraction (wt %) | | | 35 | 35 | 35 | 36 | 36 | 36 | 36 | 36 | 36 |
| | Piezoelectricity (mV) | Normal piezoelectricity | 35° C. | 158 | 176 | 181 | 155 | 172 | 188 | 153 | 174 | 180 |
| | | Pressure-resistant piezoelectricity | | 152 | 168 | 171 | 148 | 161 | 173 | 146 | 163 | 172 |
| | | Normal piezoelectricity | 80° C. | 153 | 173 | 183 | 155 | 171 | 180 | 155 | 173 | 183 |
| | | Pressure-resistant piezoelectricity | | 140 | 163 | 174 | 145 | 159 | 172 | 142 | 160 | 175 |
| | | Pressure-resistant piezoelectricity after aging at 80° C. | 35° C. | 95 | 102 | 103 | 95 | 98 | 102 | 103 | 105 | 104 |

TABLE 4

| | | | | Example | | | | | | | | |
|---|---|---|---|---|---|---|---|---|---|---|---|---|
| | | | | 28 | 29 | 30 | 31 | 32 | 33 | 34 | 35 | 36 |
| Composition (parts by weight) | Resin | Propylene-ethylene random copolymer | AW | 100 | 100 | 100 | 0 | 0 | 0 | 0 | 0 | 0 |
| | | | BW | 0 | 0 | 0 | 100 | 100 | 100 | 0 | 0 | 0 |
| | | | CW | 0 | 0 | 0 | 0 | 0 | 0 | 100 | 100 | 100 |
| | Crosslinking agent | Trimethylolpropane trimethacrylate | | 3.6 | 3.6 | 3.6 | 3.6 | 3.6 | 3.6 | 3.6 | 3.6 | 3.6 |

TABLE 4-continued

| | | | | Example | | | | | | | | |
|---|---|---|---|---|---|---|---|---|---|---|---|---|
| | | | | 28 | 29 | 30 | 31 | 32 | 33 | 34 | 35 | 36 |
| | Foaming agent | Azodicarbonamide | | 4.3 | 6.5 | 8.8 | 4.3 | 6.5 | 8.8 | 4.3 | 6.5 | 8.8 |
| | Metal harm inhibitor | Methylbenzotriazole | | 0.5 | 0.5 | 0.5 | 0.5 | 0.5 | 0.5 | 0.5 | 0.5 | 0.5 |
| | Oxidation inhibitor | Tetrakis[3-(3,5-di-tert-buthyl-4-hydroxyphenyl)propionyloxymethyl]methane | | 1 | 1 | 1 | 1 | 1 | 1 | 1 | 1 | 1 |
| Electron beam irradiation intensity (kGy) | | | | 25 | 25 | 25 | 25 | 25 | 25 | 25 | 25 | 25 |
| Stretch ratio (times) | | | | 3 | 3 | 3 | 3 | 3 | 3 | 3 | 3 | 3 |
| Evaluation | Total content of fatty acids and fatty acid derivatives (ppm) | | | <1 | <1 | <1 | <1 | <1 | <1 | <1 | <1 | <1 |
| | Average thickness of polypropylene-based resin foam sheet (μm) | | | 142 | 142 | 141 | 146 | 144 | 143 | 144 | 141 | 145 |
| | Foaming ratio (times) | | | 4.4 | 6.3 | 8.1 | 4.4 | 6 | 7.8 | 4.2 | 6.4 | 8.2 |
| | Gel fraction (wt %) | | | 35 | 35 | 35 | 36 | 36 | 36 | 36 | 36 | 36 |
| | Piezoelectricity (mV) | Normal piezoelectricity | 35° C. | 154 | 171 | 180 | 156 | 173 | 180 | 153 | 173 | 184 |
| | | Pressure-resistant piezoelectricity | | 147 | 165 | 177 | 151 | 165 | 173 | 143 | 167 | 178 |
| | | Normal piezoelectricity | 80° C. | 152 | 175 | 183 | 151 | 175 | 185 | 150 | 170 | 184 |
| | | Pressure-resistant piezoelectricity | | 137 | 163 | 174 | 138 | 164 | 173 | 141 | 157 | 169 |
| | | Pressure-resistant piezoelectricity after aging at 80° C. | 35° C. | 98 | 105 | 104 | 102 | 103 | 103 | 98 | 99 | 108 |

TABLE 5

| | | | | Example | | | | | |
|---|---|---|---|---|---|---|---|---|---|
| | | | | 37 | 38 | 39 | 40 | 41 | 42 |
| Composition (parts by weight) | Resin | Propylene-ethylene random copolymer | AW | 90 | 70 | 0 | 0 | 0 | 0 |
| | | | BW | 0 | 0 | 90 | 70 | 0 | 0 |
| | | | CW | 0 | 0 | 0 | 0 | 90 | 70 |
| | | | DW | 10 | 30 | 10 | 30 | 10 | 30 |
| | Crosslinking agent | Trimethylolpropane trimethacrylate | | 3.6 | 3.6 | 3.6 | 3.6 | 3.6 | 3.6 |
| | Foaming agent | Azodicarbonamide | | 6.5 | 6.5 | 6.5 | 6.5 | 6.5 | 6.5 |
| | Metal harm inhibitor | Methylbenzotriazole | | 0.5 | 0.5 | 0.5 | 0.5 | 0.5 | 0.5 |
| | Oxidation inhibitor | Tetrakis[3-(3,5-di-tert-buthyl-4-hydroxyphenyl)propionyloxymethyl]methane | | 1 | 1 | 1 | 1 | 1 | 1 |
| Electron beam irradiation intensity (kGy) | | | | 25 | 25 | 25 | 25 | 25 | 25 |
| Stretch ratio (times) | | | | 4 | 4 | 4 | 4 | 4 | 4 |
| Evaluation | Total content of fatty acids and fatty acid derivatives (ppm) | | | <1 | <1 | <1 | <1 | <1 | <1 |
| | Average thickness of polypropylene-based resin foam sheet (μm) | | | 128 | 121 | 127 | 124 | 122 | 125 |
| | Foaming ratio (times) | | | 6.5 | 6.4 | 6.1 | 6.3 | 6.4 | 6.1 |
| | Gel fraction (wt %) | | | 36 | 36 | 37 | 37 | 37 | 37 |
| | Piezoelectricity (mV) | Normal piezoelectricity | 35° C. | 173 | 173 | 170 | 176 | 175 | 174 |
| | | Pressure-resistant piezoelectricity | | 163 | 168 | 165 | 161 | 166 | 164 |
| | | Normal piezoelectricity | 80° C. | 176 | 172 | 175 | 174 | 171 | 172 |
| | | Pressure-resistant piezoelectricity | | 162 | 165 | 161 | 164 | 163 | 160 |
| | | Pressure-resistant piezoelectricity after aging at 80° C. | 35° C. | 102 | 105 | 104 | 103 | 103 | 103 |

TABLE 6

| | | | | Comparative Example | | | |
|---|---|---|---|---|---|---|---|
| | | | | 1 | 2 | 3 | 4 |
| Composition (parts by weight) | Resin | Propylene-ethylene random copolymer | D | 100 | 0 | 0 | 0 |
| | | | E | 0 | 100 | 0 | 0 |
| | | | DW | 0 | 0 | 100 | 0 |
| | | | EW | 0 | 0 | 0 | 100 |

TABLE 6-continued

|  |  |  | Comparative Example | | | |
|---|---|---|---|---|---|---|
|  |  |  | 1 | 2 | 3 | 4 |
|  | Crosslinking agent | Trimethylolpropane trimethacrylate |  | 3.6 | 3.6 | 3.6 | 3.6 |
|  | Foaming agent | Azodicarbonamide | 6.5 | 6.5 | 6.5 | 6.5 |
|  | Metal harm inhibitor | Methylbenzotriazole | 0.5 | 0.5 | 0.5 | 0.5 |
|  | Oxidation inhibitor | Tetrakis[3-(3,5-di-tert-buthyl-4-hydroxyphenyl)pro-pionyloxymethyl]methane | 1 | 1 | 1 | 1 |
| Electron beam irradiation intensity (kGy) | | | 25 | 25 | 25 | 25 |
| Stretch ratio (times) | | | 4 | 4 | 4 | 4 |
| Evaluation | Total content of fatty acids and fatty acid derivatives (ppm) | | 780 | 250 | <1 | <1 |
|  | Average thickness of polypropylene-based resin foam sheet (μm) | | 122 | 126 | 128 | 121 |
|  | Foaming ratio (times) | | 6.1 | 6.5 | 6.6 | 6.2 |
|  | Gel fraction (wt %) | | 36 | 37 | 36 | 37 |
|  | Piezoelectricity (mV) | Normal piezoelectricity 35° C. | 172 | 174 | 171 | 175 |
|  |  | Pressure-resistant piezoelectricity | 87 | 108 | 88 | 103 |
|  |  | Normal piezoelectricity 80° C. | 176 | 175 | 174 | 170 |
|  |  | Pressure-resistant piezoelectricity | 39 | 42 | 38 | 40 |
|  |  | Pressure-resistant piezoelectricity after aging at 80° C. 35° C. | 12 | 20 | 98 | 101 |

TABLE 7

|  |  |  |  | Comparative Example | | | | | |
|---|---|---|---|---|---|---|---|---|---|
|  |  |  |  | 5 | 6 | 7 | 8 | 9 | 10 |
| Composition (parts by weight) | Resin | Propylene-ethylene random copolymer | AW | 100 | 100 | 0 | 0 | 0 | 0 |
|  |  |  | BW | 0 | 0 | 100 | 100 | 0 | 0 |
|  |  |  | CW | 0 | 0 | 0 | 0 | 100 | 100 |
|  | Crosslinking agent | Trimethylolpropane trimethacrylate |  | 3.6 | 3.6 | 3.6 | 3.6 | 3.6 | 3.6 |
|  | Foaming agent | Azodicarbonamide |  | 2.1 | 10.3 | 2.1 | 10.3 | 2.1 | 10.3 |
|  | Metal harm inhibitor | Methylbenzotriazole |  | 0.5 | 0.5 | 0.5 | 0.5 | 0.5 | 0.5 |
|  | Oxidation inhibitor | Tetrakis[3-(3,5-di-tert-buthyl-4-hydroxyphenyl)pro-pionyloxymethyl]methane |  | 1 | 1 | 1 | 1 | 1 | 1 |
| Electron beam irradiation intensity (kGy) | | | | 25 | 25 | 25 | 25 | 25 | 25 |
| Stretch ratio (times) | | | | 4 | 4 | 4 | 4 | 4 | 4 |
| Evaluation | Total content of fatty acids and fatty acid derivatives (ppm) | | | <1 | <1 | <1 | <1 | <1 | <1 |
|  | Average thickness of polypropylene-based resin foam sheet (μm) | | | 128 | 124 | 121 | 126 | 123 | 123 |
|  | Foaming ratio (times) | | | 3.3 | 9.7 | 3.1 | 9.6 | 3.3 | 9.6 |
|  | Gel fraction (wt %) | | | 35 | 35 | 36 | 36 | 36 | 36 |
|  | Piezoelectricity (mV) | Normal piezoelectricity | 35° C. | 133 | 194 | 132 | 191 | 135 | 192 |
|  |  | Pressure-resistant piezoelectricity |  | 85 | 102 | 95 | 95 | 90 | 99 |
|  |  | Normal piezoelectricity | 80° C. | 134 | 194 | 135 | 192 | 134 | 196 |
|  |  | Pressure-resistant piezoelectricity |  | 38 | 46 | 40 | 53 | 52 | 49 |
|  |  | Pressure-resistant piezoelectricity after aging at 80° C. | 35° C. | 90 | 105 | 91 | 106 | 91 | 106 |

TABLE 8

|  |  |  |  | Comparative Example | | | | | |
|---|---|---|---|---|---|---|---|---|---|
|  |  |  |  | 11 | 12 | 13 | 14 | 15 | 16 |
| Composition (parts by weight) | Resin | Propylene-ethylene random copolymer | AW | 100 | 100 | 0 | 0 | 0 | 0 |
|  |  |  | BW | 0 | 0 | 100 | 100 | 0 | 0 |
|  |  |  | CW | 0 | 0 | 0 | 0 | 100 | 100 |

TABLE 8-continued

| | | | | Comparative Example | | | | | |
|---|---|---|---|---|---|---|---|---|---|
| | | | | 11 | 12 | 13 | 14 | 15 | 16 |
| | Crosslinking agent | Trimethylolpropane trimethacrylate | | 3.1 | 4 | 3.1 | 4 | 4 | 4 |
| | Foaming agent | Azodicarbonamide | | 6.5 | 6.5 | 6.5 | 6.5 | 6.5 | 6.5 |
| | Metal harm inhibitor | Methylbenzotriazole | | 0.5 | 0.5 | 0.5 | 0.5 | 0.5 | 0.5 |
| | Oxidation inhibitor | Tetrakis[3-(3,5-di-tert-buthyl-4-hydroxyphenyl)pro-pionyloxymethyl]methane | | 1 | 1 | 1 | 1 | 1 | 1 |
| Electron beam irradiation intensity (kGy) | | | | 20 | 45 | 20 | 45 | 20 | 45 |
| Stretch ratio (times) | | | | 4 | 4 | 4 | 4 | 4 | 4 |
| Evaluation | Total content of fatty acids and fatty acid derivatives (ppm) | | | <1 | <1 | <1 | <1 | <1 | <1 |
| | Average thickness of polypropylene-based resin foam sheet (μm) | | | 121 | 123 | 122 | 124 | 127 | 124 |
| | Foaming ratio (times) | | | 6.2 | 6.2 | 6 | 6.5 | 6.1 | 6.3 |
| | Gel fraction (wt %) | | | 27 | 53 | 27 | 57 | 28 | 53 |
| | Piezoelectricity (mV) | Normal piezoelectricity | 35° C. | 175 | 171 | 172 | 176 | 174 | 172 |
| | | Pressure-resistant piezoelectricity | | 85 | 86 | 98 | 82 | 103 | 102 |
| | | Normal piezoelectricity | 80° C. | 171 | 174 | 174 | 172 | 173 | 174 |
| | | Pressure-resistant piezoelectricity | | 40 | 56 | 51 | 49 | 48 | 53 |
| | | Pressure-resistant piezoelectricity after aging at 80° C. | 35° C. | 101 | 102 | 101 | 102 | 101 | 100 |

TABLE 9

| | | | | Comparative Example | | | | | |
|---|---|---|---|---|---|---|---|---|---|
| | | | | 17 | 18 | 19 | 20 | 21 | 22 |
| Composition (parts by weight) | Resin | Propylene-ethylene random copolymer | AW | 100 | 100 | 0 | 0 | 0 | 0 |
| | | | BW | 0 | 0 | 100 | 100 | 0 | 0 |
| | | | CW | 0 | 0 | 0 | 0 | 100 | 100 |
| | Crosslinking agent | Trimethylolpropane trimethacrylate | | 3.6 | 3.6 | 3.6 | 3.6 | 3.6 | 3.6 |
| | Foaming agent | Azodicarbonamide | | 6.5 | 6.5 | 6.5 | 6.5 | 6.5 | 6.5 |
| | Metal harm inhibitor | Methylbenzotriazole | | 0.5 | 0.5 | 0.5 | 0.5 | 0.5 | 0.5 |
| | Oxidation inhibitor | Tetrakis[3-(3,5-di-tert-buthyl-4-hydroxyphenyl)pro-pionyloxymethyl]methane | | 1 | 1 | 1 | 1 | 1 | 1 |
| Electron beam irradiation intensity (kGy) | | | | 25 | 25 | 25 | 25 | 25 | 25 |
| Stretch ratio (times) | | | | 5 | 3 | 5 | 3 | 5 | 3 |
| Evaluation | Total content of fatty acids and fatty acid derivatives (ppm) | | | <1 | <1 | <1 | <1 | <1 | <1 |
| | Average thickness of polypropylene-based resin foam sheet (μm) | | | 85 | 168 | 82 | 161 | 86 | 163 |
| | Foaming ratio (times) | | | 6 | 6.5 | 6.2 | 6.2 | 6.1 | 6.4 |
| | Gel fraction (wt %) | | | 35 | 35 | 36 | 36 | 36 | 36 |
| | Piezoelectricity (mV) | Normal piezoelectricity | 35° C. | 173 | 171 | 174 | 174 | 172 | 170 |
| | | Pressure-resistant piezoelectricity | | 105 | 101 | 88 | 86 | 95 | 91 |
| | | Normal piezoelectricity | 80° C. | 176 | 172 | 171 | 171 | 174 | 170 |
| | | Pressure-resistant piezoelectricity | | 52 | 51 | 44 | 49 | 53 | 47 |
| | | Pressure-resistant piezoelectricity after aging at 80° C. | 35° C. | 101 | 100 | 100 | 105 | 102 | 100 |

CROSS-REFERENCE OF RELATED APPLICATIONS

The present patent application claims priority based on Japanese Patent Application No. 2014-50656 filed Mar. 13, 2014, the entire disclosure of which is incorporated herein by reference.

INDUSTRIAL APPLICABILITY

A piezoelectric sensor can be configured using the electret sheet of the invention. Piezoelectric sensors can be suitably used as various sensors. Examples of the sensors include a sensor for detecting biological signals, a sensor for sensing the presence or absence of the passage of people, cars, or trains, a sensor for sensing a person leaving the bed, and a sensor for sensing shaking or abnormality of constructions or structures.

REFERENCE SIGNS LIST $L_1$ Straight line
$L_{11}$ Major axis dimension
$L_2$ Straight line
$L_{21}$ Minor axis dimension

The invention claimed is:

1. An electret sheet comprising an electrically charged propylene-based resin foam sheet having an average thickness of 90 to 150 μm, a foaming ratio of 3.5 to 9 times, and a gel fraction of 30% to 50% by weight,
wherein the propylene-based resin foam sheet includes a resin composition containing a crosslinked body of a propylene-α-olefin random copolymer having a weight average molecular weight of 370,000 to 420,000 at a proportion of 60% by weight or more.

2. The electret sheet according to claim 1, wherein the gel fraction of the propylene-based resin foam sheet is 35% to 50% by weight.

3. The electret sheet according to claim 2, wherein the total content of fatty acids and fatty acid amides included in all of the crosslinked bodies of the propylene-α-olefin random copolymer in the resin composition is 50 ppm or less relative to the total weight of the crosslinked bodies of the propylene-α-olefin random copolymer.

4. The electret sheet according to claim 2, wherein the crosslinked body of the propylene-α-olefin random copolymer is a crosslinked body formed using a polyfunctional acrylic monomer.

5. The electret sheet according to claim 1, wherein the total content of fatty acids and fatty acid amides included in all of the crosslinked bodies of the propylene-α-olefin random copolymer in the resin composition is 50 ppm or less relative to the total weight of the crosslinked bodies of the propylene-α-olefin random copolymer.

6. The electret sheet according to claim 1, wherein the crosslinked body of the propylene-α-olefin random copolymer is a crosslinked body formed using a polyfunctional acrylic monomer.

7. A piezoelectric sensor comprising:
the electret sheet according to claim 1;
a signal electrode laminated on a first surface of the electret sheet; and
a ground electrode laminated on the second surface of the electret sheet.

* * * * *